Patented Jan. 10, 1939

2,142,989

UNITED STATES PATENT OFFICE 2,142,989

ABIETYL ESTERS OF POLYCARBOXYLIC ACIDS

Harold J. Barrett, Wilmington, and Wilbur A. Lazier, Elsmere, Del., assignors to E. I. du Pont de Nemours & Company, Wilmington, Del., a corporation of Delaware No Drawing. Application October 19, 1934, Serial No. 749,070

7 Claims. (Cl. 260—103)

This invention relates to esters, and more particularly to polycarboxylic acid esters of alcohols derivable from natural acidic resins, more particularly to polycarboxylic acid esters of abietyl alcohol, their method of preparation and utilization.

This case is a continuation in part of application Serial No. 669,202, filed May 3, 1933, which has issued as U. S. Patent No. 2,047,663.

This invention has as an object the preparation of polycarboxylic acid esters of alcohols derivable from natural acidic resins. A further more specific object is the preparation of polycarboxylic acid esters of abietyl alcohol. Another object is the preparation of plastic and coating compositions containing these esters. Other objects will appear hereinafter.

These objects are accomplished by the following invention wherein a polycarboxylic acid ester of an alcohol derivable by carboxyl hydrogenation of a natural acidic resin, e. g., abietyl alcohol, is prepared by reacting the polycarboxylic acid, its acid halide, its anhydride, or its ester with a volatile alcohol, with the alcohol such as abietyl alcohol derivable from the natural acidic resin by hydrogenation, and thereafter utilizing these esters in plastic and coating compositions, and the like.

There are various methods of preparing the polycarboxylic acid esters of alcohols derivable from natural acidic resins of the present invention. They may be prepared by reacting the polycarboxylic acid with the alcohol at a sufficiently high temperature preferably above 100° C., to expel the water produced in the reaction as it is formed. The process may also be expedited by using a catalyst such as litharge, p-toluenesulfonic acid, sulfuric acid, hydrochloric acid, and the like. It may also be expedited by using an inert solvent such as toluene, benzene, xylene, chlorobenzene, ethylene dichloride, etc., to aid in the removal of the water produced in the reaction. One or more of these expedients may be used. In place of the polycarboxylic acid there may be used its anhydride, its acid halide, or its ester with an alcohol more volatile than the resin alcohol. The esters may likewise be prepared from the sodium or other metal salt of the polycarboxylic acid and the halide or sulfate of the alcohol. The esters may likewise be made by reacting the halide of the polycarboxylic acid with the sodium or other alkali metal salt of the alcohol.

Having outlined above the general principles and purposes of the invention, the following examples are submitted for purposes of illustration but not in limitation:

Example 1.—Abietyl acid phthalate

A mixture of 460 grams of abietyl alcohol and 219 grams of phthalic anhydride was placed in a one-liter, three-neck flask fitted with a stirrer and thermometer, and the mixture heated at 120° to 130° C. for five hours, throughout which period of heating the reaction mass was blanketed with carbon dioxide. The product obtained was a brittle, yellow solid having an acid number of 127.6.

Example 2.—Diabietyl phthalate

A mixture of 28.4 grams of abietyl alcohol and 7.4 grams of phthalic anhydride was placed in a flask provided with mechanical agitation and heated at 225° C. for two hours and fifteen minutes. The product obtained was a brittle solid having an acid number of 30.1.

Example 3.—Abietyl butyl phthalate

A mixture of 679 grams of abietyl acid phthalate (prepared as in Example 1, above) and 375 grams of normal-butyl alcohol was refluxed at 150° to 200° C. for 19 hours in a vessel provided with means for removing the water produced in the reaction and returning the butyl alcohol continuously to the reaction mass. The product was a viscous, light brown liquid having an acid number of 5.1.

Example 4.—Abietyl acid succinate

A mixture of 100 grams succinic anhydride and 311 grams of abietyl alcohol was heated in a one-liter three-neck flask, fitted with a stirrer and thermometer, for 5 hours at 115° to 130° C. The product obtained was a resinous solid of acid number 137.4.

Example 5.—Methoxyethyl abietyl succinate

A mixture of 411 grams of abietyl acid succinate (prepared as in Example 4, above) and 275 grams of the methyl ether of ethylene glycol was refluxed under a fractionating column for 15.5 hours, the water produced in the reaction being continuously removed. The temperature of the contents of the flask was allowed to rise gradually from 138° to 200° C. and the excess methoxyethanol distilled off with steam. The residue was dried at 160° to 190° C. and a viscous, red-brown liquid of acid number 3.5 recovered.

Example 6.—Diabietyl tetrahydronaphthalenedicarboxylate

A mixture of 124 grams dimethyl tetrahydronaphthalenedicarboxylate, 311 grams of abietyl alcohol, 200 grams of toluene, and 5 grams of litharge was refluxed under a fractionating column for three hours, and the methyl alcohol produced continuously removed as a constant boiling mixture with toluene. The temperature of the solution was allowed to rise gradually from 145° to 198° C. and the diabietyl tetrahydronaphthalenedicarboxylate recovered from the solution by steam distillation of the solvent. The product obtained was a dark, red-brown resin-like material of acid number 9.

The above examples illustrate the use of abietyl alcohol but are not limited to this alcohol by any means.

The method of preparation of the esters as herein described is capable of considerable modifications. Thus, in Example 6 the litharge ester interchange catalyst may be replaced by sodium hydroxide, p-toluenesulfonic acid, calcium oxide, magnesium oxide, or other ester interchange catalysts. The toluene of this example may be replaced by xylene, benzene, chlorobenzene, ethylene dichloride, or the like. Solvents may be used with or without catalysts. The temperature of the reactions may be varied within wide limits, depending upon the particular mode of preparation of the esters and the nature of the polycarboxylic acid employed.

The carbon dioxide of Example 1 and other examples is merely illustrative of an inert gas. Nitrogen, carbon monoxide, methane, or other gas inert to the reaction components may also be employed.

While specific examples have indicated the use of the alcohols obtainable from rosin by carboxyl hydrogenation, the esters of which alcohols form a preferred embodiment of the example, the invention is also applicable to the preparation of polycarboxylic acid esters of alcohols obtainable through the carboxylic reduction (catalytic or otherwise) of natural acidic resins generally, e. g., kauri, Manila, Congo, sandarac, dammar, pontianac, Sierra Leone, Zanzibar, etc. These alcohols are of similar nature inasmuch as they are all primary alcohols. They are likewise alicyclic alcohols containing as they do complicated, at least partially saturated ring nuclei.

In place of the polycarboxylic acids of the examples there may be used other polycarboxylic acids, for example, maleic acid, malic acid, adipic acid, sebacic acid, tartaric acid, citric acid, benzophenone-2,2'-dicarboxylic acid, chlorophthalic acid, di-biphenyl-2,2'-dicarboxylic acid, dinaphthylketone-2,2-dicarboxylic acid, diphenic acid, hemimellitic acid, hexahydrophenylenediacetic acid, hexahydrophthalic acid, naphthalenedicarboxylic acids, naphthalic acid, cinchonic acid, pyrocinchonic acid, salicylacetic acid, tetrahydrophthalic acid, azelaic acid, camphoric acid, diglycolic acid, dilactylic acid, fumaric acid, itaconic acid, malomalic acid, pimelic acid, suberic acid, etc.

Example 3 illustrates a mixed polycarboxylic acid ester of an alcohol derivable from a natural acidic resin by carboxylic reduction and an alcohol of more familiar character, i. e., butyl. The butyl alcohol is representative of a large class of alcohols, including allyl, amyl, cetyl, eleostearyl, cyclohexyl, isobutyl, myristyl, oleyl, terpinyl, bornyl, fenchyl, and other monohydric alcohols, dimethylin, beta-propoxyethanol, butoxyethanol, methoxyethanol, and other monohydric ether alcohols, as well as polyhydric alcohols such as glycerol, polyglycerol, ethylene glycol, and the like. Similarly, highly useful mixed compositions may be made by replacing in part the polycarboxylic acid by a monobasic acid such as acrylic, methacrylic, crotonic, levulinic, lactic, glycolic, naphthenic, butyric, isobutyric, hydroxycaproic, capric, hexahydrobenzoic, abietic, palmitic, phenylacetic, benzoic, toluic, salicylic, benzoylacetic, quinic, and the like, as well as mixtures of acids such as linseed oil acids, China-wood oil acids, soya bean oil acids, acids obtainable by the oxidation of waxes, acids obtainable by the oxidation of the higher alcohols obtained in the catalytic syntheses of methanol from carbon monoxide, and the like.

The above description and specific examples are intended to be illustrative only. Any modification of or variation therefrom which conforms to the spirit of the invention is intended to be included within the scope of the claims.

We claim:

1. A polycarboxylic acid ester of an alcohol, said alcohol being a natural acidic resin with the carboxyl thereof replaced by a carbinol group.
2. An abietyl ester of a polycarboxylic acid.
3. An abietyl ester of a phthalic acid.
4. Abietyl phthalate.
5. A composition of matter comprising, as a dominant component, an abietyl phthalate.
6. Process which comprises reacting approximately one mol of phthalic anhydride and approximately one mol of abietyl alcohol at a temperature approximating 125° C. for 5 hours in the presence of an inert gas.
7. Process which comprises heating abietyl alcohol with phthalic anhydride to reaction temperature.

HAROLD J. BARRETT.
WILBUR A. LAZIER.